US009828138B2

(12) United States Patent
Buccellato

(10) Patent No.: US 9,828,138 B2
(45) Date of Patent: Nov. 28, 2017

(54) DOUGH PRODUCT AND METHOD OF PACKAGING

(71) Applicant: GENERAL MILLS, INC., Minneapolis, MN (US)

(72) Inventor: Jim T. Buccellato, Blaine, MN (US)

(73) Assignee: General Mills, Inc., Minneapolis, MN (US)

(*) Notice: Subject to any disclaimer, the term of this patent is extended or adjusted under 35 U.S.C. 154(b) by 234 days.

(21) Appl. No.: 14/514,447

(22) Filed: Oct. 15, 2014

(65) Prior Publication Data

US 2016/0107794 A1    Apr. 21, 2016

(51) Int. Cl.
| B65D 25/04 | (2006.01) |
| B65D 85/72 | (2006.01) |
| B65D 21/08 | (2006.01) |
| A21D 10/02 | (2006.01) |
| B65D 81/32 | (2006.01) |

(52) U.S. Cl.
CPC .......... *B65D 25/04* (2013.01); *A21D 10/025* (2013.01); *B65D 21/08* (2013.01); *B65D 81/3233* (2013.01); *B65D 85/72* (2013.01)

(58) Field of Classification Search
CPC .............. Y10S 206/83; Y10S 206/807; B65D 81/3216; B65D 81/3205; B65D 81/3233; B65D 3/24; B65D 3/04; B65D 3/267; B65D 3/00; B65D 3/18; B65D 3/26; B65D 3/264; B65D 3/266; B65D 3/28; B65D 85/36; B65D 85/72; B65D 15/06; B65D 2101/0007; B65D 2251/0018; B65D 2251/0093; B65D 51/20; B65D 77/08
See application file for complete search history.

(56) References Cited

U.S. PATENT DOCUMENTS

| 1,811,772 | A | * | 6/1931 | Willoughby ........... B65D 57/00 |
| | | | | 206/499 |
| 2,949,369 | A | | 8/1960 | Zoeller et al. |
| 3,015,429 | A | | 1/1962 | Morici |
| 3,182,890 | A | | 5/1965 | Elam |
| 3,506,459 | A | | 4/1970 | Parlour |
| 3,851,757 | A | | 12/1974 | Turpin |
| 4,114,784 | A | | 9/1978 | Hough et al. |
| 4,388,336 | A | * | 6/1983 | Yong .................... A21D 10/025 |
| | | | | 426/128 |
| 5,447,236 | A | | 9/1995 | Perry et al. |
| 5,749,460 | A | | 5/1998 | Rice |
| 5,950,913 | A | | 9/1999 | Rea et al. |

(Continued)

*Primary Examiner* — Viren Thakur
*Assistant Examiner* — Thanh H Nguyen
(74) *Attorney, Agent, or Firm* — John L. Crimmins, Esq.; Diederiks & Whitelaw, PLC

(57) ABSTRACT

A canned dough product includes at least one dough product loaded in a lower compartment of a container and at least one additional ingredient provided in an upper compartment, with the upper and lower compartments being spaced by a separator. The dough expands upon proofing in the container, causing the separator to shift and vary the volumes of the compartments. The expanding dough abuts a central region of the separator, causing the separator to flex, engage an inner surface of the container and become fixed in the container, while the lower compartment becomes fluidly sealed from the upper compartment and different pressures are established in the compartments.

19 Claims, 4 Drawing Sheets

(56) References Cited

U.S. PATENT DOCUMENTS

| | | |
|---|---|---|
| 6,109,470 A | 8/2000 | Antal, Sr. et al. |
| 6,116,500 A | 9/2000 | Cahill |
| 6,152,355 A | 11/2000 | Morrow et al. |
| 2010/0098815 A1* | 4/2010 | Norquist ................ A21D 6/001 426/120 |
| 2011/0280998 A1 | 11/2011 | Lorence et al. |
| 2012/0258211 A9 | 10/2012 | Kackman et al. |

* cited by examiner

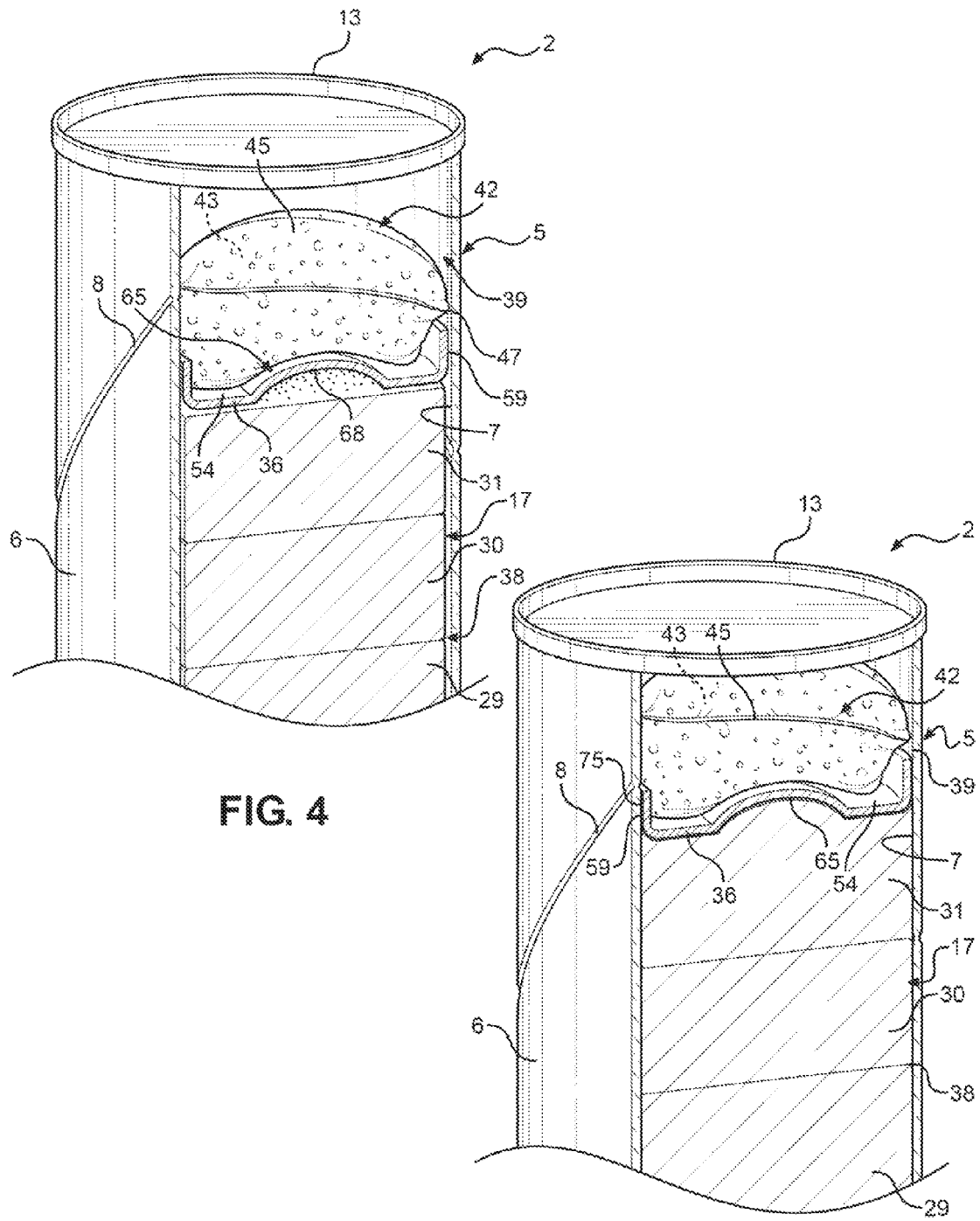

DOUGH PRODUCT AND METHOD OF PACKAGING

BACKGROUND OF THE INVENTION

The invention generally pertains to the art of food preparation and, more specifically, to a packaged dough product, as well as a method of packaging the dough product. In particular, the invention is concerned with employing a separator to compartmentalize a tubular container for packaging both dough and an additional ingredient in separate regions within the tubular container, wherein the dough proofs and expands within the package so as to vary the relative volume of the separate regions and alter internal pressures within the tubular container.

Due to the time demands placed on consumers by the everyday activities of modern life, the preparation of food products and meals from scratch has decreased and the popularity of pre-made or partially pre-made foods has increased dramatically. A food product that has become increasingly popular in a pre-made configuration are dough based food products such as, for example, developed and undeveloped dough products. These dough products can be stored in either a refrigerated or frozen state for extended periods and are "freshly" prepared in a matter of minutes as desired by the consumer. In some instances, these dough products can represent a substantially final product requiring only a heating or baking step such as, for example, cookies, bread, bread sticks, biscuits and croissants. Alternatively, these dough precuts can represent components or building blocks of a final product such as, for example, a pie crust or pizza dough that will be combined with a variety of other ingredients to form the final product. Regardless of whether the dough product itself constitutes a final product or merely a component of the final product, these dough products constitute enormous time savers for the consumer in that the consumer need not prepare the dough products from scratch using base ingredients such as, for example, flour, water, eggs, yeast, salt, sugar and the like.

One popular method for packaging and storing dough products has been to use a can format, wherein the dough product is contained within a cylindrical, paperboard body having caps at both ends of the body. Depending upon the dough product, these cans can be constructed to withstand increased internal pressures. While the can format can work very well for dough products, there are some instances in which it is desirable to include additional ingredients with the dough product in order to complete or enhance enjoyment of the final cooked dough product. In order to accommodate these additional ingredients in a can format, a variety of designs have been utilized for separating the additional ingredients from the dough. Certain known configurations employ the use of separate cup assemblies to store the additional ingredients. While cup assemblies can be successfully used to separate and store both dough and additional ingredients in a can format, the use of these cup assemblies can lead to an increase in packaging costs due to increased raw material costs and packaging complexities. To address this concern, it has also been proposed to replace the cup assemblies with pouches. With either arrangement, given that the dough will proof within the can and thereby expand, resulting in an increase in the internal pressure of the can, care must be taken to assure that the pouch can withstand the increased internal pressure. Typically, this pressure issue is addressed in two ways, i.e., designing the can to release the building pressure and constructing the cup or pouch to withstand the increased pressure. Unfortunately, regardless of efforts expended in this field, it is not uncommon for the cups or pouches of additional ingredients to burst within the can.

SUMMARY OF THE INVENTION

In accordance with the invention, a canned dough product includes a food package container in the form of a tube, such as a spirally wound paperboard or other fibrous tube, having a closed, internal cavity which is separated into two compartments by a separator. In one of the compartments is stored at least one dough product, while the other compartment houses at least one additional ingredient for use with the dough product. In a preferred form of the invention, the at least one additional ingredient is contained in a pouch.

During initial packaging, the tube is closed at one end and then loaded with one or more dough products. The dough product(s) can take various forms, such as a rolled dough sheet or individually stacked dough discs. Positioned above the dough product(s) is the separator, followed by the additional ingredient(s) and a tube closure member or end cap. A reverse loading order can also be employed.

Subsequent to the initial packaging, the dough product proofs and expands within the tube, causing the separator to shift, thereby increasing the volume of the dough product containing compartment and reducing the volume of the additional ingredient containing compartment. The separator is specifically sized and configured to enable not only the initial shifting but to also expand in diameter such that, subsequent to the shifting, an outer annular wall of the separator is forced against an inner surface of the tube, thereby preventing the separator from further floating or sliding within the tube. More specifically, in a preferred configuration, the separator is formed with a domed region into which the dough product expands upon proofing. When this occurs, outward radial forces are exerted on the separator, with these forces causing increased engagement between the outer wall of the separator and the inner tube surface. Continued proofing of the dough product causes sealing of the dough containing compartment and a rise in the internal pressure of this compartment relative to the ingredient containing compartment.

Additional objects, features and advantages of the invention will become more readily apparent from the following detailed description of the invention wherein like reference numerals refer to corresponding components in the several views.

BRIEF DESCRIPTION OF THE DRAWINGS

FIG. 4 is a partial sectional view of the dough product package of the invention upon initial packaging.

FIG. 5 is a partial sectional view, similar to FIG. 4, following proofing and expanding of the dough in the product package.

DETAILED DESCRIPTION OF INVENTION

Figure 1:
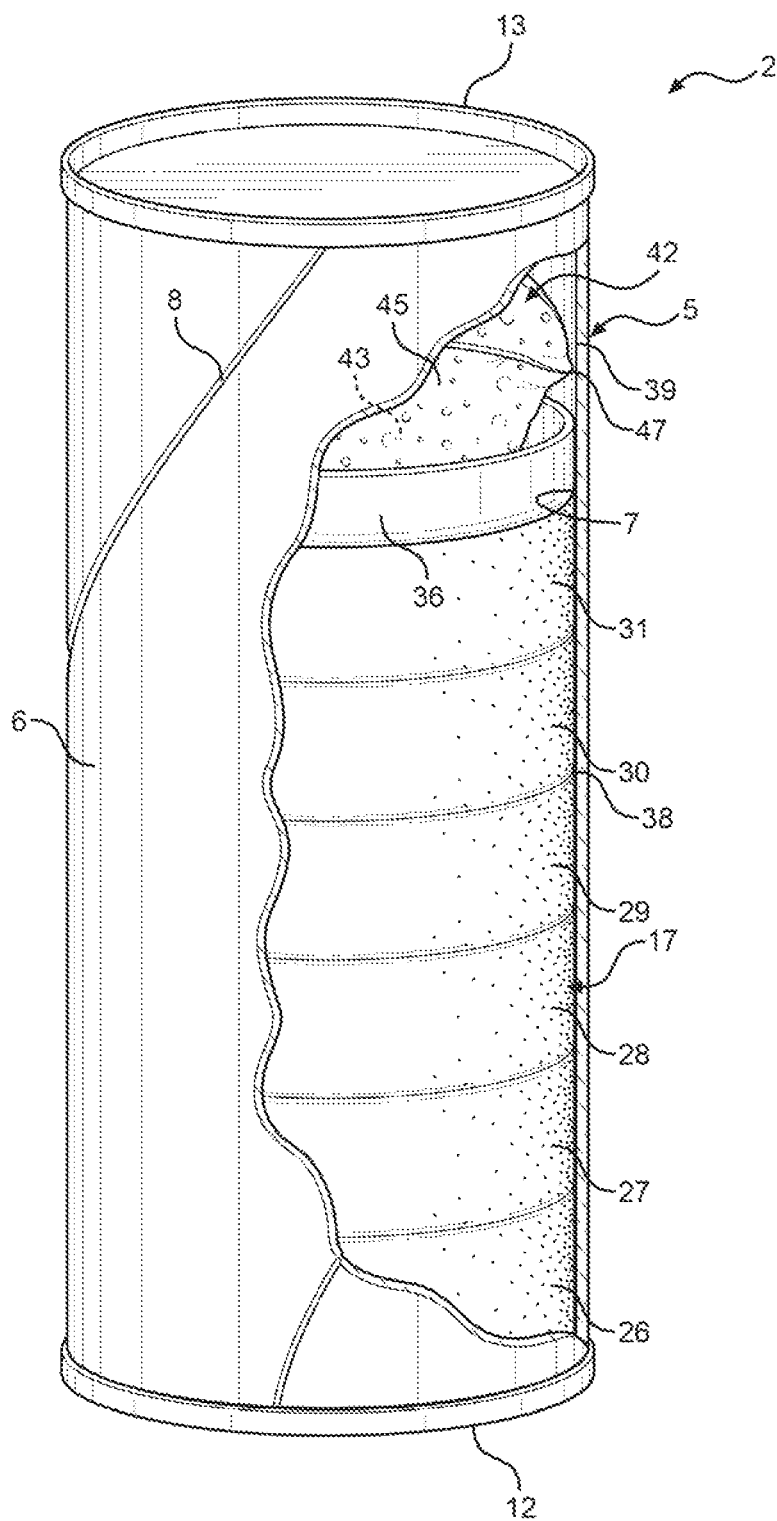
FIG. 1 is a partial cross-sectional view of a dough product package constructed in accordance with the invention.

With initial reference to FIG. 1, there is shown a canned dough product provided in a food package container generally indicated at 2. Container 2 takes the form of a tube 5 having an outer surface 6 and an inner surface 7. In the embodiment shown, tube 5 is made of paperboard and includes a spiral seam 8. Tube 5 is closed at both ends, such as with first and second end caps 12 and 13 which are crimped or otherwise secured to ends of tube 5 to establish a closed, interior cavity 17.

Interior cavity 17 is configured to contain one or more dough products. In the embodiment depicted, interior cavity 17 is shown to house a plurality of stacked dough products 26-31 in the form of dough discs used to make biscuits. However, at this point, it should be realized that the invention can be utilized in packaging various different types of dough products, including dough discs, one or more sheets of dough or even a block of dough, for making a wide range of final products, including cookies, bread, biscuits, rolls, croissants, pie crust, pizza dough and the like. In any case, above dough products 26-31 is positioned a separator 36 which constitutes a solid member that divides interior cavity 17 into a first or lower compartment 38 and a second or upper compartment 39. On the other side of separator 36, in upper compartment 39, is shown a pouch 42 which houses one or more additional ingredients 43 for use with dough products 26-31. For instance, in the case of the illustrated embodiment wherein dough products 26-31 constitute discs used to make biscuits, pouch 42 can be employed to contain icing which can be spread upon the cooked biscuits. In other embodiments, pouch 42 can contain other ingredients such as garlic, cheese, butter or the like. Although the use of a pouch is preferred, one or more other types of containers could be provided in upper compartment 39 to store the additional ingredient(s). In the embodiment shown, pouch 42 includes an outer wrapper 45 having one or more sealed end portions, such as that indicated at 47.

Figure 2:
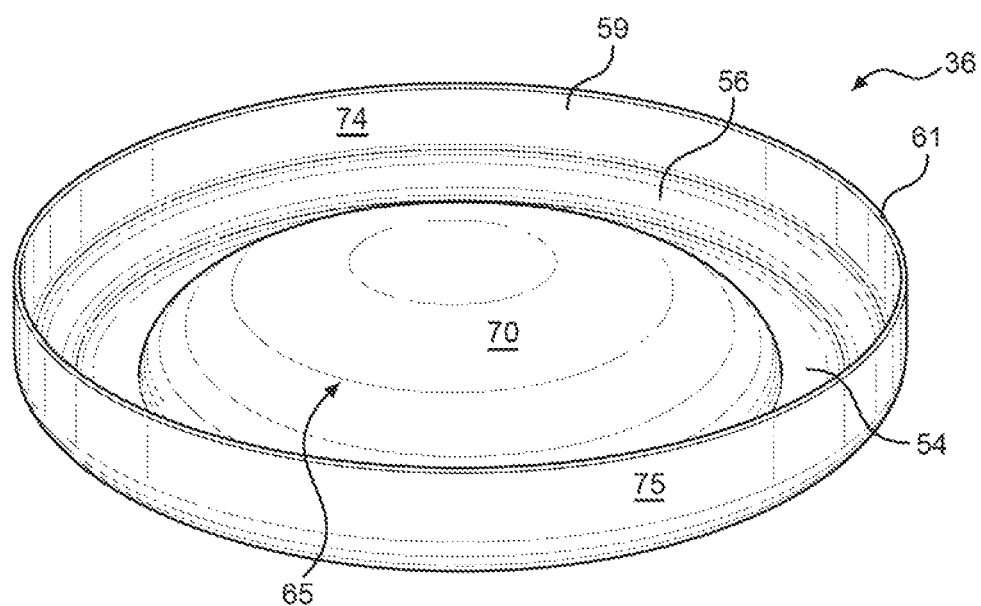
FIG. 2 is an upper perspective view of a separator incorporated into the package of FIG. 1.
Figure 3:
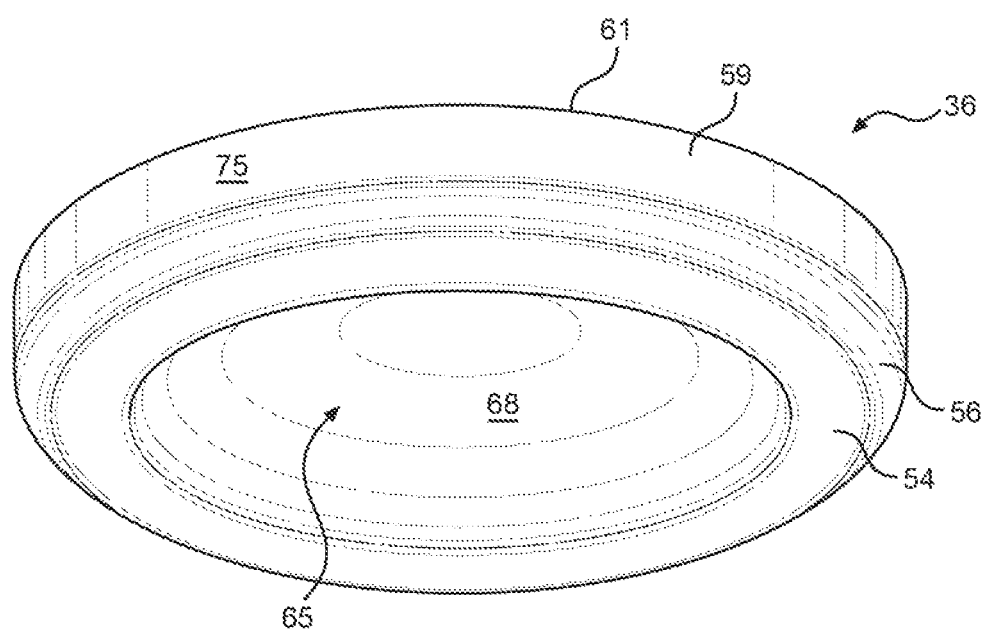
FIG. 3 is a lower perspective view of the separator of FIG. 2.

Reference will now be made to FIGS. 2 and 3 in detailing the structure associated with separator 36. As shown in these perspective views, separator 36 includes a generally flat, base ring portion 54 extending to a curved outer wall portion 56 which leads to an upstanding annular wall 59 having an upper terminal peripheral edge 61. Radially inward of base ring portion 54, separator includes a central domed region 65 established by a lower concave portion 68 and an opposing, upper convex portion 70. In a preferred form of the invention, convex portion 70 extends upward to a height corresponding to or below peripheral edge 61 and is spaced from an inner surface 74 of upstanding annular wall 59 by base ring portion 54 and curved outer wall portion 56. Also labeled in FIG. 3 is an outer surface 75 of upstanding annular wall 59.

It should be noted that the size and shape of separator 36 is based on the preferred use of cylindrical tube 5. As will become more fully evident below, other complementary tube and separator configurations could be employed, including a wide range of polygon designs. In addition, the central region 65 of separator 36 preferably employs smooth arcuate contours for reasons detailed below, yet other recess configurations could be employed. The actual size of tube 5 can also greatly vary but, in the most preferred embodiments wherein tube 5 is cylindrical, tube 5 will typically have an inner diameter between 1.75 inches (approximately 4.5 cm) and 2.875 inches (approximately 7.3 cm). Separator 36 is correspondingly sized so as to be only slightly smaller in diameter for reasons which will become fully evident below from a detailed discussion of the initial packaging of container 2, along with the subsequent sealing and pressurization of container 2.

FIG. 4 illustrates container 2 after initial packaging. That is, tube 5 has been initially closed off on one end by first end cap 12 (shown in FIG. 1 but not FIG. 4), such as by crimping first end cap 12 to tube 5, prior to dough products 26-31 (note dough products 29-31 shown in FIG. 4) being vertically stacked within interior cavity 17. Thereafter, separator 36 is pushed into tube 5, specifically with concave portion 68 of central dome region 65 being directly exposed to dough product 31. At this point, it should be realized that upstanding annular wall 59 has a height dimension along inner surface 7. Although this dimension can vary, a preferred embodiment of separator 36 provides for a height of about ⅜-½ inches (approximately 1-1.25 cm) for upstanding annular wall 59. At the same time, outer wall surface 75 of separator 36 lightly engages inner surface 7 thereby enabling separator 36 to initially float within interior cavity 17, while also separating interior cavity 17 into lower compartment 38 and upper compartment 39. What is particularly important to note is that the height of upstanding annular wall 59 is sufficient to maintain proper positioning of separator 36 within container 2, i.e., prevents separator 36 from cocking or angling in container 2 and keeps separator 36 square to dough product 26-31 as separator 36 shifts due to the dough pressure. Thereafter, pouch 42 is placed upon separator 36 within upper compartment 39 and, finally, second end cap 13 is crimped or otherwise secured in place to close off tube 5.

As discussed above, dough products 26-31 at least partially proof within container 2. That is, as is known in the art, the dough includes a leavening agent, such as yeast, which will cause dough products 26-31 to expand within container 2 as illustrated in comparing FIGS. 4 and 5. Important in connection with the invention is that, when dough products 26-31 expand, separator 36 will be caused to shift within tube 5 to alter the volumes of lower and upper compartments 38 and 39, and lower and upper compartments 38 and 39 will become fluidly sealed from each other. More specifically, the proofing of the dough will cause the dough to rise within tube 5. As the dough is in contact with at least base ring portion 54 of separator 36, both separator 36 and pouch 42 will, at least initially, be caused to rise. During initial dough expansion, there is some increase in pressure in the overall container 2, but at least some of this pressure can leak out of container 2, such as being directed along spiral seam 8 and/or around separator 36 and out around second end cap 13. However, as some point, separator 36 will meet some significant resistance to shifting within tube 5, causing the dough of dough product 31 to enter and at least partially fill central dome region 65. The continued expansion of the dough creates outward radial forces to be exerted on central domed region 65 which, in turn, causes outer wall surface 75 of upstanding annular wall 59 to flex radially outwardly and seat against inner surface 7 of tube 5, thereby fixing separator 36 in place. At this same time, the dough will fill in other gaps within lower compartment 38, including the gaps associated with first end cap 12, spiral seam 8 and separator 36, resulting in lower compartment 38 becoming fluidly sealed from upper compartment 39 as reflected in FIG. 5. Further proofing increases the pressure in lower compartment 38, such as between 20-30 psi (approximately 1.4-2.0 atm or 1.4-2.0 bar), while upper compartment 39 remains at atmospheric pressure.

With the above arrangement, since upper compartment 39 is at a much lower pressure, there is no concern with pouch 42 bursting. In addition, tube 5 can withstand the greater pressure, particularly with the inclusion of a label (not shown) which holds spiral seam 8 together. With the variable volume compartment arrangement of the invention, a standard container of this type can be advantageously reduced in overall height, generally by about ¼ inch (0.6 cm) without reducing the amount of dough being provided. Obviously, with mass production, this represents a significant material cost savings.

Figure 6:
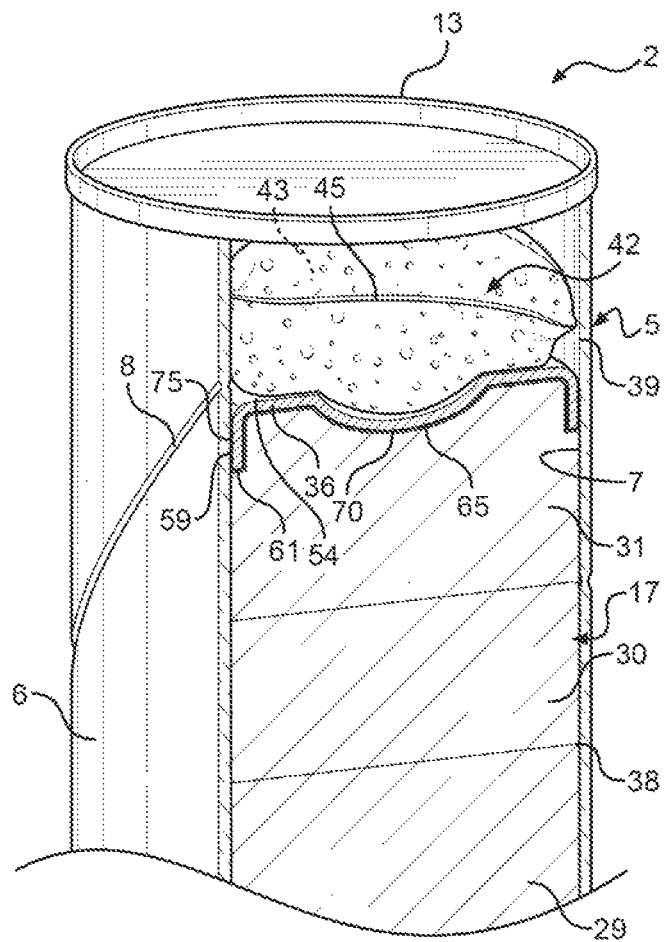
FIG. 6 represents another embodiment wherein the separator is inverted from that shown in FIG. 5.

Certainly, various changes to the above described arrangements can occur without departing from the invention. For instance, the order of loading the container can be reversed. Also the separator could be inverted such as shown in FIG. 6 wherein like reference numerals are utilized. Here, it can be seen that separator 36 is inverted relative to the FIG. 5 arrangement. To enhance the insertion of separator 36 in accordance with this embodiment, rim 61 is preferably chamfered or tapered. In any case, in this configuration, the proofing and expanding dough products 26-31 will cause the initial shifting of separator 36 and, with the abutment of dough product 31 with convex surface 70 of separator 36, the subsequent radial expansion of separator 36 such that upstanding annular wall 59 is pushed tight against inner surface 7 in a manner corresponding to that detailed above. In either case, separator 36 will prevent the dough from enveloping pouch 42 and aid in establishing the different pressures in compartments 38 and 39.

The invention claimed is:

1. A canned dough product comprising:
    a container having an interior cavity defined between spaced ends of the container;
    at least one dough product which is housed and proofs within the container;
    at least one additional ingredient housed within the container; and
    a separator dividing the interior cavity into a first compartment housing the at least one dough product and a second compartment housing the at least one additional ingredient, said separator including an upstanding wall portion, a flat base portion leading to the upstanding wall portion and a central region defined by a dome and spaced radially inward from both the base portion and the upstanding wall portion, with both the upstanding wall portion and the central region extending in a common direction from the base portion, wherein the separator is configured to a) initially float within the container so as to enable volumes of the first and second compartments to vary and b) subsequently become fixed within the interior cavity at a position spaced from the ends of the container upon proofing of the at least one dough product by the dough product abutting and deflecting the central portion resulting in the upstanding wall engaging and sealing against an inner surface of the interior cavity.

2. The canned dough product of claim 1, wherein the domed, central region includes a concave portion exposed to the first compartment and a convex portion exposed to the second compartment.

3. The canned dough product of claim 1, wherein the domed, central region includes a convex portion exposed to the first compartment and a concave portion exposed to the second compartment.

4. The canned dough product of claim 1, wherein the separator further includes a curved outer wall portion interconnecting the base portion and the upstanding wall portion.

5. The canned dough product of claim 1, wherein the base portion constitutes a base ring portion and the upstanding wall portion constitutes an upstanding annular wall.

6. The canned dough product of claim 1, further comprising: a pouch containing the at least one additional ingredient in the second compartment.

7. A canned dough product comprising:
    a container having an interior cavity an interior cavity defined between spaced ends of the container;
    at least one dough product which is housed and proofs within the container;
    at least one additional ingredient housed within the container; and
    a separator dividing the interior cavity into a first compartment housing the at least one dough product and a second compartment housing the at least one additional ingredient, wherein said separator includes a flat base portion, leading to an annular upstanding wall portion which extends from the base portion to a terminal peripheral edge of the upstanding wall portion, and a central region which is defined by a dome, is located radially inward of the base portion, is spaced radially from the upstanding wall portion by the base portion and extends from the base portion in a common direction to the upstanding wall portion, wherein, upon proofing of the at least one dough product within the container, the at least one dough product is caused to abut, impart radially forces onto and deflect the central region which, in turn, causes the upstanding wall portion to flex radially outwardly against the container.

8. The canned dough product of claim 7, wherein the central region includes a concave portion exposed to the first compartment and a convex portion exposed to the second compartment.

9. The canned dough product of claim 7, wherein the central region includes a convex portion exposed to the first compartment and a concave portion exposed to the second compartment.

10. The canned dough product of claim 7, wherein the separator further includes a curved outer wall portion interconnecting the base portion and the upstanding wall portion.

11. The canned dough product of claim 7, wherein the base portion constitutes a base ring portion and the upstanding wall portion constitutes an upstanding annular wall.

12. The canned dough product of claim 7, further comprising: a pouch containing the at least one additional ingredient in the second compartment.

13. The canned dough product of claim 7, wherein the separator is configured to initially float within the container so as to enable volumes of the first and second compartments to vary and to subsequently become fixed within the interior cavity at a position wherein the terminal peripheral edge is spaced from the ends of the container upon proofing of the at least one dough product, with the upstanding wall portion engaging and sealing against an inner surface of the interior cavity.

14. A method of packaging a canned dough product comprising:
    closing off a lower end of a container tube;
    loading at least one dough product into an interior cavity of the tube;
    inserting a separator into the interior cavity, with the separator dividing the interior cavity into a lower compartment within which the at least one dough product is contained and an upper compartment, with said separator including an upstanding wall portion, a flat base portion leading to the upstanding wall portion and a central region defined by a dome and spaced radially inward from both the base portion and the upstanding wall portion, with both the upstanding wall portion and the central region extending in a common direction from the base portion;

loading an additional ingredient into the upper compartment;

closing off an upper end of the container tube, with the interior cavity being defined between the spaced lower and upper ends of the container tube; and proofing the at least one dough product in the tube, initially causing the separator to float within the tube so as to vary volumes of the lower and upper compartments and, subsequently, to become fixed within the interior cavity at a position spaced from the upper and lower ends of the container by the dough product abutting and deflecting the central portion resulting in the upstanding wall engaging and sealing against an inner surface of the interior cavity.

15. The method of claim 14, wherein the central region exposed to the lower compartment and, upon proofing, the at least one dough product expands and abuts the central region to create forces acting on an upstanding wall of the separator, causing the separator to flex and seat against an inner surface of the tube, thereby fixing the separator within the interior cavity of the tube.

16. The method of claim 15, wherein the central doomed region includes a concave portion exposed to the lower compartment and a convex portion exposed to the upper compartment, said at least one dough product expanding into the concave portion which causes the separator to flex outwardly.

17. The method of claim 15, wherein the central doomed region includes a convex portion exposed to the lower compartment and a concave portion exposed to the upper compartment, said at least one dough product expanding and abutting the convex portion which causes the separator to flex outwardly.

18. The method of claim 14, wherein proofing of the at least one dough product seals the lower compartment from the upper compartment and different pressures are established in the compartments, with the lower compartment having a higher pressure than the upper compartment.

19. The method of claim 14, wherein loading an additional ingredient into the upper compartment includes inserting a pouch containing the at least one additional ingredient into the upper compartment.

* * * * *